(12) United States Patent
Baude et al.

(10) Patent No.: US 8,185,257 B2
(45) Date of Patent: May 22, 2012

(54) AUTOMATED SYSTEM WITH DETERMINISTIC RESPONSE TIMES

(75) Inventors: Pierre Baude, Toulouse (FR); Christophe Caillaud, Blagnac (FR)

(73) Assignee: Thales (FR)

( * ) Notice: Subject to any disclaimer, the term of this patent is extended or adjusted under 35 U.S.C. 154(b) by 353 days.

(21) Appl. No.: 12/446,724

(22) PCT Filed: May 9, 2008

(86) PCT No.: PCT/EP2008/055740
§ 371 (c)(1),
(2), (4) Date: Apr. 22, 2009

(87) PCT Pub. No.: WO2008/141953
PCT Pub. Date: Nov. 27, 2008

(65) Prior Publication Data
US 2010/0087969 A1    Apr. 8, 2010

(30) Foreign Application Priority Data

May 11, 2007 (FR) .................................... 07 03386

(51) Int. Cl.
*G01C 21/00* (2006.01)
*G06F 9/48* (2006.01)
(52) U.S. Cl. ................................. 701/3; 701/1; 713/320
(58) Field of Classification Search .................. 701/3, 4, 701/1; 713/320
See application file for complete search history.

(56) References Cited

U.S. PATENT DOCUMENTS

| | | | | |
|---|---|---|---|---|
| 6,122,572 | A * | 9/2000 | Yavnai | 701/23 |
| 6,922,703 | B1 | 7/2005 | Snyder et al. | |
| 2004/0078136 | A1 * | 4/2004 | Cornell et al. | 701/120 |
| 2006/0036879 | A1 * | 2/2006 | Wahler et al. | 713/300 |
| 2008/0168285 | A1 * | 7/2008 | de Cesare et al. | 713/320 |

FOREIGN PATENT DOCUMENTS

EP    0 798 685 A1    10/1997

OTHER PUBLICATIONS

Pam Binns, "A Robust High-Performance Time Partitioning Algorithm: The Digital Engine Operating System (DEOS) Approach", Proceedings 20th Digital Avionics Systems Conference (DASC), Oct. 14, 2001, pp. 1.B.6-1-1.B.6-12, vol. 1, IEEE, Piscataway, N.J., USA.
John Penix, et al., "Verifying Time Partitioning in the DEOS Scheduling Kernel", Formal Methods in System Design, Mar. 1, 2005, pp. 103-135, vol. 26, No. 2, Kluwer Academic Publishers.
Charlie McElhone, "Soft Computations within Integrated a Vionics System", Proceedings of the IEEE 2000 National Aerospace and Electronics Conference (NAECON 2000), Oct. 10, 2000, pp. 27-34, IEEE, Piscataway, N.J., USA.

* cited by examiner

*Primary Examiner* — Tan Q Nguyen
(74) *Attorney, Agent, or Firm* — Baker & Hostetler LLP

(57) ABSTRACT

The invention relates to an automated system, for example an aircraft flight management system (FMS). If proposes harmonizing the response times of the FMS system between the various scenarios of one and the same family, as and when the product, and its usage context, changes.
The system according to the invention comprises several subsystems, the external instruction processing time of which is variable, its response time to one and the same command being independent of the volume of internal and external data manipulated and of the future functional changes, and it is characterized in that it comprises, in each of its subsystems that have variable processing times and/or are likely to change (FPLN, NavDB, TRAJ/PRED, etc.), an explicit resource consuming subsystem (SPARE) simulating a processing time, the duration of which is at least equal to the difference between the maximum processing duration predictable at the end of life of the subsystem that incorporates it and the current processing duration, and a timer subsystem (TIMER) triggered by a processing instruction for which the timer duration is at least equal to the current processing time of said instruction plus the time determined by the explicit resource consuming subsystem.

3 Claims, 3 Drawing Sheets

AUTOMATED SYSTEM WITH DETERMINISTIC RESPONSE TIMES

FIELD OF THE INVENTION

The present invention relates to an automated or semi-automated system, in particular a navigation system, with deterministic response times.

DESCRIPTION OF RELATED ART

The increasing part played by automation over the last 25 years in the aeronautical field, both civilian and military, is resulting more and more in the crew using electronic systems and less and less in the crew directly influencing the primary aircraft piloting commands.

This trend has been accentuated over the last 15 years with the roll-out of onboard flight management systems (FMS).

A flight management system comprises various functional components which enable the crew to program a flight from a navigation database. The system then calculates a lateral and vertical trajectory making it possible to reach the destination of the flight plan based on the characteristics of the aircraft and the data supplied by the crew and the environment of the system. The positioning and guidance functions collaborate to help the pilot remain on this trajectory.

The interface functions with the crew and with the ground make it possible to include humans in the navigation loop, because they are solely responsible for the progress of the flight.

FIG. 1 is a block diagram of an FMS. It mainly comprises the following functions: HMI (human-machine interface), "GUIDANCE", "LOC" (location), "PRINTER" (printers), "PRED" (predictions), "NAVDB" (navigation databases), "DATALINK" (ground-air digital link), "TRAJ" (definition of trajectory), "FPLN" (flight plan), "IO" (inputs and outputs), "DUAL" (redundancy management) and "SPARE", a function existing in certain FMSs, but with a functionality different than that of the inventive "SPARE" function, and which has therefore been represented outside the FMS proper, and which is described hereinbelow with reference to the invention.

A flight management system combines a large quantity of data:
  obtained from sensors (IRS, GPS, VHF) for navigation,
  obtained from databases (navigation databases NAVDB) to generate the electronic flight plan,
  obtained from performance databases to generate the predictions along the flight plan,
  obtained from manual inputs performed by the crew (normally to initialize the calculations) or automatic inputs by ground/onboard digital data link coming from the company or from control centers (ATC).

A flight management system is therefore extremely complex, in particular according to the quantity of information that it processes.

In the particular case of information originating from the crew, much of it is used to modify the reference flight plan. These modifications are intrinsically very different but obey one and the same master plan.

FIG. 2 is a simplified block diagram representation of the various flight plan revision steps. The main functions implemented are represented at the top of the figure, but obviously other functions can be implemented. These functions are: a human-machine interface HMI, the flight plan computer FPLN (which is a subset of the FMS computer), the navigation database NavDB, and the trajectory prediction TRAJ/PRED.

The various main steps of a process of revision of a flight plan will now be explained with reference to FIG. 2, working from top to bottom, that is, in chronological order. When the pilot P wants to make a revision, he enters an instruction (P1) on his HMI interface, which transmits it to the FPLN (1). The latter sends a request (2) to the database NavDB, which searches in its data (3) and sends it the result (4). FPLN performs a linkage of the modification in the flight plan (5). If the modification is completed correctly, FPLN sends a corresponding "status OK" indication (6) to the HMI interface for display to the pilot. Also, FPLN sends to the prediction system TRAJ/PRED the new flight plan (7), that is, the flight plan incorporating the modification corresponding to the revision instruction 1. This prediction system calculates its short-term predictions (8) and communicates the results thereof (9) to the HMI interface. The latter displays the update (10). The time taken to perform the steps 1 to 10 is the response time of the FMS system in performing a revision of the flight plan.

Furthermore, the TRAJ/PRED function calculates the long-term path predictions, to the destination of the current flight (11). Once this calculation is completed, the TRAJ/PRED function sends (12) the HMI interface the available version of the long-term flight predictions (taking into account the revision concerned). Finally, the HMI interface updates the display of the long-term prediction information (13). The time taken to perform the steps 10 to 13 is the display update time.

The four actions 3, 5, 8 and 10 identify the variable parts in the family of flight plan revision operations. The first (3), which corresponds to a search in the navigation database, takes a time that is dependent on the type of data sought and the size of the database. The second (5), which corresponds to the actual inclusion of the modification requested by the pilot, depends on the type of modification and the size of the data received from the database. The third (8), which corresponds to the calculation of the reference trajectory and of the short-term speed, altitude, time, fuel, temperature, wind, and other predictions to a distance near to the aircraft (a few points or tens of nautical miles), depends on the geometry of the flight plan and on the context of the aircraft. The fourth (10), which corresponds to the update of the information displayed on the operator screens, depends mainly on the information that the operator has chosen to display and the size of the flight plan.

The two steps 11 and 13 identify the variable parts of the updating of the trajectory and of the predictions. The first (11), which corresponds to the calculation of the reference trajectory and of the predictions to the destination of the flight plan, depends on the distance to be covered and the number of procedural operations to be performed to the destination.

For each of the variable parts, because some subsystems of the FMS are periodic (that is, they perform an update of their data in a repetitive manner), the time actually taken by the non-periodic subsystems is not deterministic (this time is still bounded). When the display update sequence comprising the steps 11 to 13 is very rapid, the well-known display "flicker" effect occurs.

According to the prior art, the demonstration of the update capabilities of the system was made based on the development of a centralized dedicated resource "consumer" (called SPARE in this description), which was adapted as and when new functionalities were added. Some resources were not used because the demonstration of their availability was an explicit result of the development tools. Nothing was done to increase the determinism of the system (apart from the solutions settled on a case by case basis, with no global approach), nor to eliminate the "flicker" effect.

SUMMARY OF THE INVENTION

The present invention relates to an automated system, in particular a system handling vital functions, such as an FMS, this system comprising several functional subsystems with variable external instruction processing times, this system potentially being subject to changes, and its subject is a device making it possible to determine which, in this system, are the subsystems that prevent it being deterministic, in order to correct the behavior of these subsystems and make this system secure.

The automated system according to the invention, of the type comprising several subsystems, the external information processing time of which is variable, but must be limited in its duration, is a system for which the response time to one and the same command is independent of the volume of internal and external data manipulated and any future functional changes, and it is characterized in that it comprises, in each of its subsystems that have variable processing times and/or are likely to change, an explicit resource consuming subsystem simulating a processing time, the duration of which is at least equal to the difference between the maximum processing duration predictable at the end of life of the subsystem that incorporates it and the current processing duration, and a timer subsystem triggered by a processing instruction for which the timer duration is at least equal to the current processing time of said instruction plus the time determined by the explicit resource consuming subsystem. The maximum predictable processing duration and the current processing duration are determined on a measurement bench, each time the subsystems concerned are changed, for example.

BRIEF DESCRIPTION OF THE DRAWINGS

The present invention will be better understood from reading the detailed description of an exemplary embodiment, taken as a nonlimiting example and illustrated by the appended drawing, in which.

DETAILED DESCRIPTION OF THE INVENTION

The invention is described hereinbelow with reference to its application to an aircraft navigation system (FMS), but obviously it is not limited to this one application, and it can be implemented in any automated or semi-automated system comprising several functional subsystems with external instruction processing times that are variable and which can be subject to changes.

Figure 1:
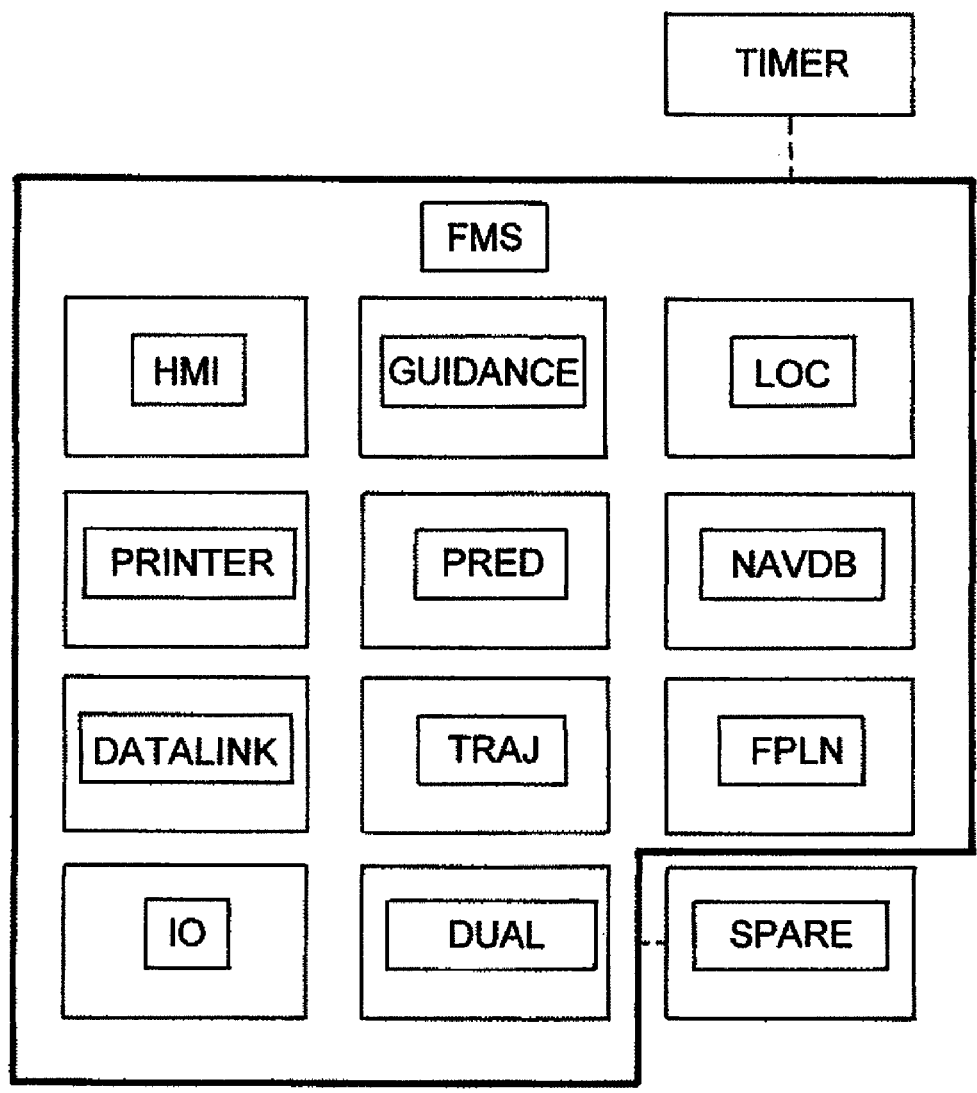
FIG. 1, already partially described hereinabove, is a block diagram of a flight management system FMS comprising the inventive device, FIG. 2, already described hereinabove, is a timing diagram of the various steps implemented to take into account a flight plan revision instruction.

As represented in FIG. 1, the inventive device comprises, in addition to the FMS, an explicit resource consuming subsystem "SPARE", this SPARE subsystem being combined with a "TIMER" subsystem. The TIMER service is a common service in an onboard system, but its use to control the response times of the FMS is an important characteristic of the invention.

The SPARE subsystem, produced, for example, using a calibrated timer loop, can be parameterized during the development of the FMS system to "consume" the calculation time that can be predicted at the end of life of the system for which it is responsible for determining the external instruction processing time. According to the present invention, this SPARE subsystem is divided among each of the other subsystems of the FMS that are likely to change, in order that, throughout the life of the FMS, its response time is the same, regardless of these changes. This makes it possible in particular to make the FMS system more deterministic and to make its behavior secure on certification and not only on intermediate deliveries of these subsystems.

The TIMER subsystem of the inventive device is a timer device determining a "certain" time period (typically of the order of one second), on expiry of which it sends a signal to the SPARE subsystem to enable it to respond to the incoming information, which makes it possible, in normal operating conditions, not to slow down the FMS system by initiating actions that in any case have to be canceled (to avoid the so-called "flicker" effect).

When the time period monitored by the TIMER has elapsed and the subsystems affected by this time period have not reacted, a dedicated indication can be saved by the FMS system, making it possible after the event to understand the context of the overrun in order to reproduce it for investigation and correction if necessary. This procedure is based on a "proprietary" investigation technology that is active or passive depending on the context of use. The two subsystems of the inventive device (SPARE and TIMER) make it possible to analyze generically the behavior of the FMS during development and monitor the calculation time not consumed in a scenario. To use the results of these analyses, the operational scenarios are classified into coherent families of the use made of them by the operator. It is then possible to monitor a subset of the scenarios to check the relevance of the resource allocations and the conformity of these allocations with respect to reality.

The SPARE subsystem is called in the context of the subsystem needing to have a deterministic behavior (for example, the navigation database manager mentioned in the example described hereinabove with reference to FIG. 2). This subsystem is capable of consuming a precise time, according to the context of the platform. The degree of precision is of the order of one cycle of the system (a typical response time to an action on the part of the pilot is of the order of one second, whereas the cycle time is of the order of 50 ms).

The SPARE subsystem globally represents the upgrade capabilities of the various subsystems that are synchronous to a greater degree of precision, because they consume a time far less than the time of a cycle. This precision is of the order of 1% of a cycle.

The TIMER subsystem is, initially, launched on calling a relatively short processing sequence, for example of the order of a few hundreds of milliseconds (like that described hereinabove with reference to FIG. 2). If the time period that it measures is not consumed at the end of the processing, the result of this sequence is not provided until the duration has elapsed. During this time, longer processing operations are launched, for example lasting several seconds. If these long processing operations are completed at the moment identified as the end of the sequence, the display of the result of this short sequence will be more complete, otherwise the intermediate results are presented, but the pilot has a deterministic response time.

If the TIMER service does not eliminate all the possible flickers (the response time expected by the pilot being less than the time needed for the complete calculation), it eliminates them in the most critical phase of a commercial flight: the approach phase.

If the processing sequence is not finished when the time period of the TIMER is completed, the indication of this anomaly is recorded because it is a problem that has to be investigated by the development teams.

In conclusion, the inventive solution proposes harmonizing the response times of the FMS system between the various scenarios of one and the same family, as and when changes are made to the product and its usage context.

The operator (in this case the pilot) thus has a system that responds in a completely deterministic way, both in the simplest operation implementing a navigation database and in more complex operations of subsequent versions, for example with a database having doubled in size.

The product development team does not have to monitor all the possible cases to control the performance characteristics of the product, because all it needs to do is to record the response time overruns of the various subsystems of the FMS, each taken separately (in the case where the timing out of the TIMER occurs before the end of the processing), and remedy them as appropriate.

Figure 2:
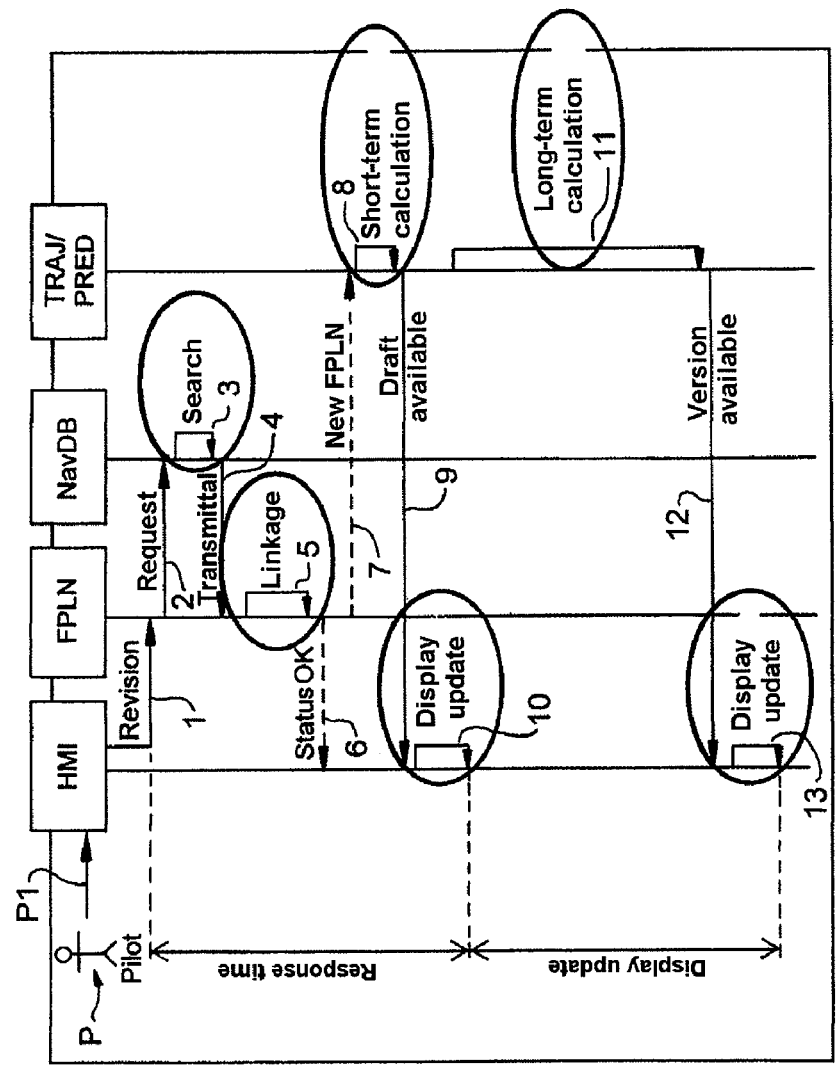
Figure 3:
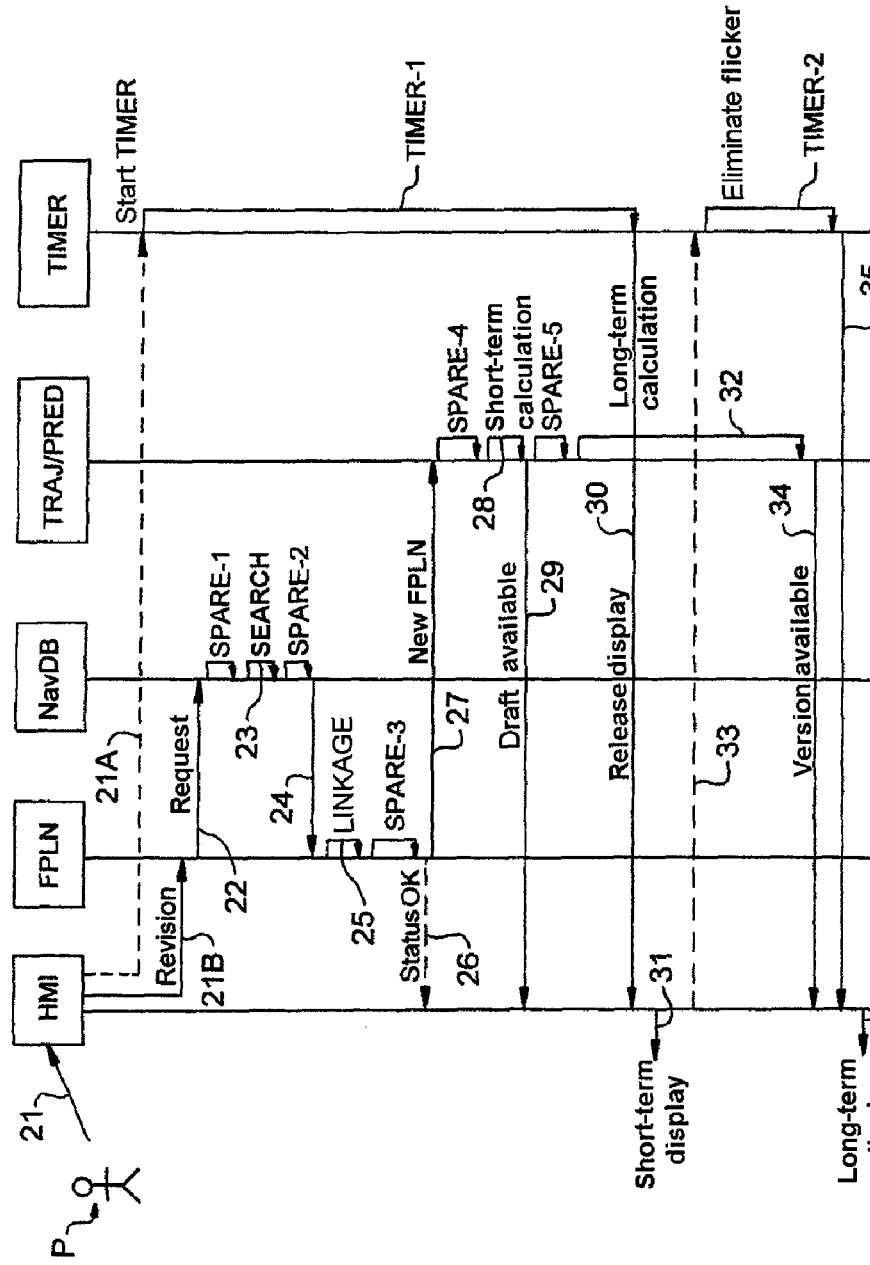
FIG. 3 is a timing diagram similar to that of FIG. 2, but with the intervention of the SPARE and TIMER subsystems according to the invention.

In the timing diagram of FIG. 3, created in the same way as that of FIG. 2, when the pilot P wants to make a revision, he actuates (21) the HMI which simultaneously sends a start instruction (21A) to the TIMER and a revision instruction (21B) to FPLN. The start instruction sent to the TIMER is intended to make it count down a time that is sufficient to enable the TRAJ/PRED subsystem to perform a calculation of long-term predictions. On receipt of the instruction 21B, FPLN sends a request (22) to NavDB, the SPARE subfunction of which begins by counting down a time period SPARE-1 intended to take account of functional changes to NavDB. After this time period, the database NavDB performs a search in its data (23), then its SPARE subsystem counts down another time period SPARE-2 (intended to take account of the predictable change in the size of the database) and sends the result (24) to FPLN which performs a linkage of the flight plan (25) to incorporate the data that NavDB has just sent it in the current flight plan. It will be noted that, as a variant, the time periods SPARE-2 and SPARE-3 can be combined into a single time period, taking place before or after the search step 23. The SPARE subfunction of FPLN then counts down a time period SPARE-3 intended to take account of the response times between different types of revisions.

If the modification of the flight plan is completed correctly, FPLN sends a corresponding "status OK" indication (26) to the HMI interface to display this status to the pilot. Also FPLN sends the prediction system TRAJ/PRED the new flight plan (27), that is, the flight plan incorporating the modification corresponding to the revision instruction 21B. The SPARE subsystem incorporated in the prediction system counts down a time period SPARE-4, then TRAJ/PRED performs a calculation of short-term predictions (28) and signals (29) to HMI that it has a new draft flight plan updated in the short term. However, the HMI interface waits for a time period TIMER-1 to elapse taking account of the elapsing of all the time periods of the various SPARE subsystems (only the time periods relating to the FPLN, NavDB and TRAJ/PRED subsystems are mentioned in FIG. 3). After this time period TIMER-1, the TIMER subsystem signals (30) to HMI that it can release the display of the short-term predictions (sent to it in 29). HMI therefore then displays these short-term predictions (31). Typically, the time period between the transmittal of the instruction 21/21A and the display 31 is of the order of one second. In the meantime, following the calculation 28, the SPARE subsystem of the TRAJ/PRED subsystem initiates another timer SPARE-5 before beginning the long-term prediction calculations (32). It will be noted that, in the example of FIG. 3, the display release instruction 30 is sent after the start of the calculation 32, but it can equally be sent before this start.

The HMI computer, after having begun the display of the short-term predictions, sends an instruction (33) to the TIMER for it to begin counting down a time period TIMER-2 (of approximately three seconds, for example), intended to eliminate the abovementioned flicker effect. While this time period is being counted down, at the end of the calculation 32, the TRAJ/PRED subsystem sends HMI (34) the long-term version of the prediction calculations.

When TIMER-2 elapses, the TIMER subsystem sends a signal (35) to the HMI interface, enabling it to display the long-term predictions, which are then effectively displayed (36).

The invention claimed is:

1. An automated system comprising several subsystems, generating internal data and executing commands,
for obtaining a response time for the execution of a command which is independent of a volume of internal or external data manipulated in order to execute said command and independent of future functional changes made to said system,
said system comprising,
a plurality of subsystems each subsystem having
a current processing time, to perform processing by the subsystem in response to an instruction to perform the command, which varies throughout functional changes made to the subsystem during the life of the system, and
a maximum processing duration, to perform processing by the subsystem in response to the command predicted for the end of life of the system;
an explicit resource consuming subsystem which simulates a processing time, the duration of which is at least equal to, when used in connection with processing performed by a first subsystem included in the plurality of subsystems in response to the instruction to perform the command, a difference between the maximum processing duration for the first subsystem and the current processing time for the first subsystem; and
a timer subsystem, used in connection with processing performed by the first subsystem in response to the instruction, for which a timer period is at least equal to the current processing time for the first subsystem plus the duration of the explicit resource consuming subsystem in connection with the processing performed by the first subsystem in response to the instruction.

2. The system as claimed in claim 1, wherein the system is an aircraft flight management system (FMS).

3. The system as claimed in claim 2, in which the first subsystem performs short-and long-term update calculations concerning short-and long-term information that has to be displayed, wherein, after receiving an instruction to display the short-term information, the first subsystem triggers the timer subsystem to count down the timer period, the end of said timer period determining an authorization to display the long-term information.

* * * * *